D. H. CHRISTMAN.
REFLUX CONDENSER.
APPLICATION FILED JUNE 24, 1916.

1,243,384.
Patented Oct. 16, 1917.

Witness:
Harry S. Gaither

Inventor:
D. H. Christman
by Chamberlin & Frendenreich,
Attys

UNITED STATES PATENT OFFICE.

DANIEL H. CHRISTMAN, OF SHREVEPORT, LOUISIANA, ASSIGNOR TO J. B. ATKINS, OF SHREVEPORT, LOUISIANA.

REFLUX-CONDENSER.

1,243,384.  Specification of Letters Patent.  Patented Oct. 16, 1917.

Application filed June 24, 1916. Serial No. 105,570.

*To all whom it may concern:*

Be it known that I, DANIEL H. CHRISTMAN, a citizen of the United States, residing at Shreveport, parish of Caddo, State of Louisiana, have invented a certain new and useful Improvement in Reflux-Condensers, and declare the following to be a full, clear, and exact description of the same, such as will enable others skilled in the art to which it pertains to make and use the same, reference being had to the accompanying drawings, which form a part of this specification.

My invention relates to the art of condensing the distilled vapors from petroleum and coal tar products and has for its object to produce a condenser through which the vapors from the still pass, leaving their heavier constituents which are condensed and graded.

Figure 1:
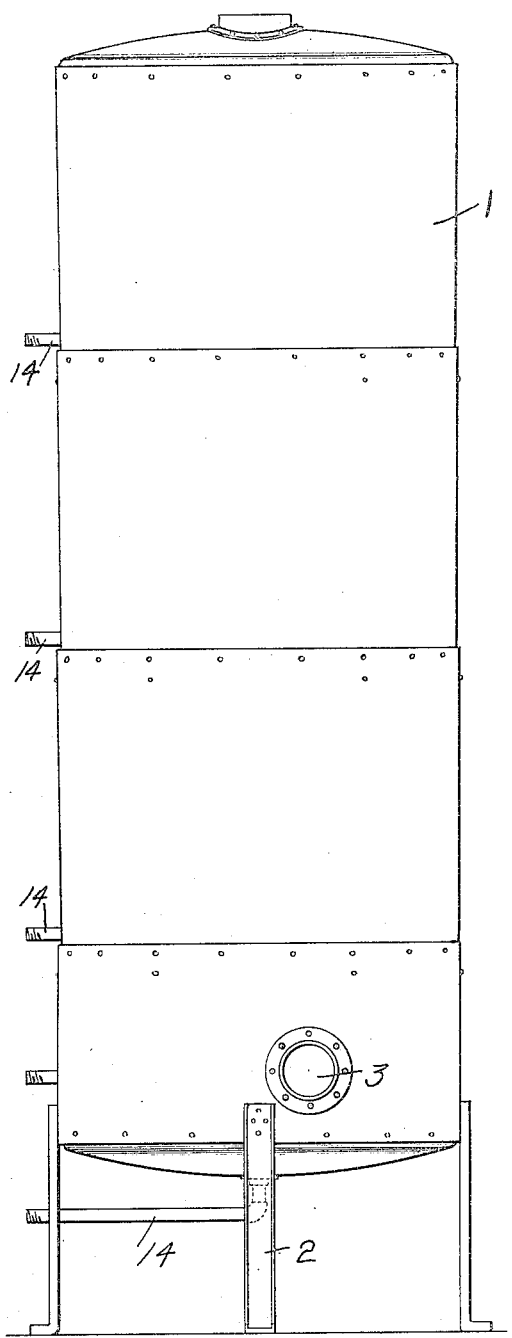
Figure 2:
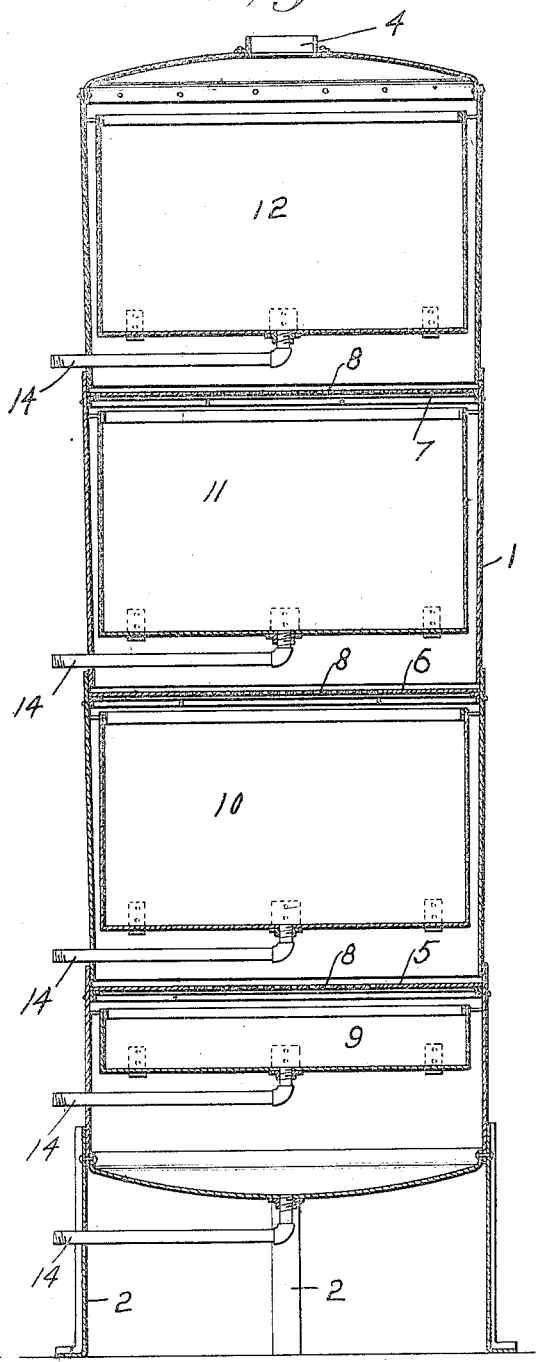

The various features of novelty whereby my invention is characterized will hereinafter be pointed out with particularity in the claims; but, for a full understanding of my invention and of its object and advantages, reference may be had to the following detailed description taken in connection with the accompanying drawing, wherein:

Figure 1 is a side elevation of an apparatus arranged in accordance with a preferred form of my invention; and Fig. 2 is a central vertical section.

Referring to the drawing, 1 represents a vertical cylindrical shell closed at its ends and supported by means of legs, 2, or otherwise. Near the bottom, but at a short distance above the same, is a large vapor inlet opening, 3. At the top is a vapor outlet, 4. Within the shell are a series of transverse partitions; three such partitions, indicated at 5, 6 and 7 being illustrated; these partitions dividing the shell into a series of compartments one above the other. The central portion of each partition is perforated as indicated at 8. In each compartment is a pan slightly smaller in diameter than the interior of the shell so as to leave an annular space around each pan. The lower pan, 9, is made comparatively shallow while the other three pans, 10, 11 and 12, are made of almost the same height as the compartments in which they lie. Although the pan 9 is made shallow, it lies just below the partition 5, thus leaving a considerable space between it and the bottom of the shell and permitting the bottom to serve as an additional pan.

From the bottom of each pan and from the bottom of the shell extend individual discharge pipes indicated at 14, each leading, independently of the others, to the exterior of the apparatus.

The vapors entering the apparatus through the inlet opening 3 pass up around the lower pan and across the top of the same to the perforated portion of the partition 5 and from there continue in the same way through each of the upper compartments and past the pans therein in a like circuitous path. As the vapors strike the relatively cool metal of the condensing apparatus, condensation begins, the heavier constituents being the first to condense and lighter ones following, so that when the vapor finally passes through the discharge outlet, all of the heavier constituents have been removed. Moreover, the point at which condensation takes place in the apparatus corresponds to the grade of the constituent which is being condensed and therefore the liquid collected by the series of pans, including the bottom of the shell, is graded according to density and is recovered in such graded condition.

While I have illustrated and described with particularity only a single preferred form of my invention, I do not desire to be limited to the exact structural details thus illustrated and described; but intend to cover all forms and arrangements which come within the terms employed in the definitions of my invention constituting the appended claims.

I claim:

1. A device of the character described comprising a vertical cylindrical shell closed at the top and at the bottom, there being a vapor inlet a short distance above the bottom and a vapor outlet at the top of the shell, a series of imperforate collecting pans arranged one above the other in the shell, said pans being of a diameter almost as great as the diameter of the shell and each having sides extending upwardly into the vicinity of the bottom of the overlying pan, the sides of the uppermost pan extending into the vicinity of the top of the shell, a transverse wall or partition extending between each pan and the pan below it and separating the shell into individual compartments, each partition being perforated at the center, and discharge conduits leading from the bottoms of said pans to the exterior of said shell independently of each other.

2. A device of the character described comprising a vertical cylindrical shell closed at the top and at the bottom, there being a vapor inlet a short distance above the bottom of the shell and a vapor outlet at the top of the shell, a series of partitions extending transversely across the shell and separating it into a plurality of individual compartments, each partition having the center thereof perforated, a collecting pan slightly smaller in diameter than the shell arranged in each of said compartments, the pan in each of the compartments except the lower one having a depth almost as great as the corresponding compartment, and the lowermost pan being shallow and lying directly below the partition forming the top of the lowermost compartment, and discharge conduits leading from the bottoms of said pans and from the bottom of said shell to the exterior of the shell independently of each other.

In testimony whereof, I sign this specification.

DANIEL H. CHRISTMAN.